Figure 1:
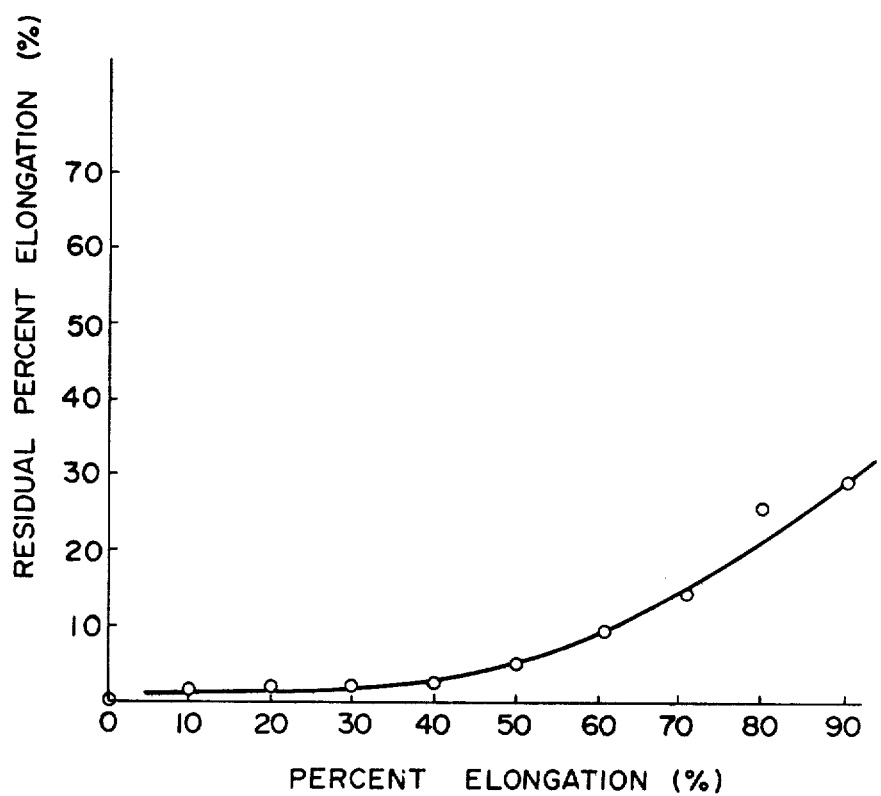

United States Patent [19]

Inoue

[11] 4,225,049
[45] Sep. 30, 1980

[54] PACKAGED ARTICLE COVERED WITH SPECIAL FILM

[75] Inventor: Tadashi Inoue, Fujisawa, Japan

[73] Assignee: Asahi-Dow Limited, Tokyo, Japan

[21] Appl. No.: 48,545

[22] Filed: Jun. 14, 1979

[30] Foreign Application Priority Data

Jun. 20, 1978 [JP] Japan ............................. 53-83612[U]

[51] Int. Cl.³ ............................................ B65D 23/08
[52] U.S. Cl. .................................... 215/12 R; 156/85; 206/497; 426/106
[58] Field of Search ................ 215/12 R; 206/497; 156/86, 85; 426/106

[56] References Cited

U.S. PATENT DOCUMENTS

| 3,604,584 | 9/1971 | Shank | 215/12 R |
| 3,972,435 | 8/1976 | Sasaki | 215/12 R |

*Primary Examiner*—William Price
*Attorney, Agent, or Firm*—Cushman, Darby & Cushman

[57] ABSTRACT

A vessel such as a glass bottle having a narrow-necked portion is protected by coating with a stretched film of crosslinked polyolefin resin having specific characteristics. The film holds the vessel very tightly through the shrink tension of the heat-shrunk film at the narrower part and through the elastic tension of the elongated film at the wider part. The protected vessel has excellent effect for preventing scattering of glass fragments at the time of breaking as well as good display effect and cap-seal effect. The coated film has also good printability.

13 Claims, 5 Drawing Figures

PACKAGED ARTICLE COVERED WITH SPECIAL FILM

This invention relates to a packaged article covered with a special plastic film and preparation thereof. More particularly, this invention relates to a vessel such as a glass bottle which is covered on its outer surface tightly with a crosslinked polyolefin resin film and also to a process for producing the same.

Glasses are materials having very excellent strength in nature, but when scratches or scrapes are generated on their surfaces, such strength is extremely lowered. Accordingly, glass vessels such as bottles which have excellent strength when they are manufactured may suffer from scratches or scrapes caused by various factors in the steps such as printing, filling of the contents, packaging, transportation or handling by consumers, whereby their strength may greatly be lowered.

In order to solve this problem, there has been known a method wherein the outer surfaces of the glass bottles are protected with such materials as metal oxides or organic high molecular materials which are applied by spraying or dipping. The glass bottles obtained by this method are not only excellent in resistance to scratches or scrapes but also have the effect for preventing scattering of glass fragments at the time of breaking of bottles, whereby scattering of glass fragments accompanied by bursting or crushing of bottles when they are dropped can be suppressed at minimum. These bottles have therefore been widely used for filling liquids having inner pressures such as soda-waters. However, in these uses directed for end consumers, there are frequently attached labels on the outer surfaces of glass bottles for indicating names, contents and other letters or figures. For this purpose, prior to coating of metal oxides or organic high molecular materials on glass bottles, printing is applied directly on the outer surfaces thereof or labels having printed letters or others are sealed thereon. These steps have given the manufacturers considerable disadvantages from standpoint of productivity and economy. As another disadvantage of this method, the glass bottles are capped after application of the aforesaid outer coating and filling the contents. For glass bottles, of which contents are required to be ensured of virginity, it is necessary to use expensive caps or to apply cap sealing with plastic films or others, whereby the manufacturing steps may be very irksome.

Alternatively, there is also known a method for covering a glass bottle with a protective film in which a heat-shrinkable plastic film is coated on the glass bottle. According to this method, a heat-shrinkable plastic film or sheet on which letters and/or figures are previously printed is formed into a tube having inner circumference longer than the maximum circumference of the glass bottle to be coated and loosely covered over the glass bottle, followed by heating to effect heat shrinkage to thereby tightly cover the tube on the glass bottle. The glass bottle having the protective film covered thereon obtained according to this method has the resistance to scratches or scrapes as well as the effect for preventing scattering of glass fragments at the time of breaking of the bottle, similarly as that obtained by the method as previously described. Furthermore, in this method, designs such as of letters or figures are simultaneously imparted and cap sealing for ensuring virginity can also be effected at the same time. For these specific features, this method is superior to the former method in productivity as well as in economy.

As plastic materials to be used for the latter method, there have widely been used a large amount of semirigid polyvinyl chloride films, expanded polyethylene sheets and expanded polystyrene sheets which are excellent in printability, protective effect and packaging characteristics. However, even the best heat-shrinkable films or sheets of these classes have a maximum percent heat shrink which is at most about 55%. With such a shortage in percent heat shrink of the films or sheets, when they are provided for uses for packaging glass bottles for cooling drinks such as caffeinated drinks (e.g. Coca-Cola) or juices having a circumference ratio of the body portion to the neck portion of from 2 to 3 and also having concavo-convex designs on their surfaces, the films or sheets can poorly be contacted with glass surfaces at the neck or concavo portions with generation of wrinkles like pockmarks due to heat-shrinkage irregularities, whereby there can only be obtained the products which are extremely inferior in the protective effect, the effect for preventing scattering of glass fragments at the time of breaking of bottles and the display effect. For this reason, for protective coating of these bottles, the above films or sheets are applied only at the body portions and the bottoms thereof. The glass bottles thus protected can enjoy good display effect as well as the effect for preventing generation of damages at the body portions of bottles through collision between the glasses. However, due to the absence of the protective films at the portion from the shoulder to the neck of which reinforcement is most desired, the resultant bottles fail to have reinforcing effect against bursting of bottles and the effect for preventing scattering of glass fragments at the time of breaking of bottles.

In addition to the disadvantages as mentioned above, the glass bottles covered with expanded polyethylene or polystyrene sheets which are substantially intransparent and suffer from the vital disadvantage that the contents in the bottles cannot be seen from outside.

Prior publications such as Japanese published examined patent applications No. 6783/1958 and No. 18893/1962 and British Pat. No. 992897 also disclose stretched films of crosslinked polyolefin resins which have excellent strength, transparency and heat-shrinkable property. By making avail of such excellent characteristics, these films are also known to be applicable for coating of glass bottles to impart excellent protective effect and display effect thereto similar to those imparted by the heat-shrinkable polyvinyl chloride film as mentioned above, as is disclosed by Japanese published examined utility model application No. 27498/1973. According to the experience of the present inventors, however, when the test samples of stretched films of crosslinked polyethylene having a percent heat shrink exceeding 60% are tested for coating of Coca-Cola bottles with circumferential ratio of the body to the neck of 2.3 according to the well known method, there can be obtained no good product with good tightness between the glass and the film. Furthermore, all of the products are very poor in appearance due to heat-shrinkage irregularities. Perhaps, at the portion on which the film covered is shrinked to a smaller extent, the film retains sufficiently large heat shrink tension; while, at the portion on which the film covered is shrunk to a greater extent, the heat shrink tension of the film may extremely be lowered. Thus, at the neck portion on which the film is required to be shrunk to as much as 60%, the shrunk film fails to have a heat shrink tension left, even failing to overcome the slight sliding resistance which is formed through contact between the glass and the film. As the result, heat-shrinkage irregularities are formed partially to give no tight covering at the neck. Accordingly, even when a heatshrinkable film with percent shrink of 60% may be employed, the glass bottles for cooling drinks such as caffeinated drinks or juices with complicated forms and designs cannot be endowed with excellent display effects, protective effect and cap-seal effect at the same time by the methods of prior art.

The principal object of the present invention is to provide a vessel with complicated shapes which is tightly covered with a protective plastic film and has excellent display effect, protective effect as well as cap-seal effect.

Another object of the present invention is to provide a method for stretch-shrink packaging of a shaped article, especially vessels such as bottles, which is easy in operation and economical.

It is also another object of the present invention to provide a stretched film of a crosslinked polyolefin resin specifically tailored for the stretch-shrink packaging method of the present invention.

In its broadest aspect, the present invention provides a packaged product comprising a shaped article having different circumferences of the cross-sections along the longitudinal axis thereof with a ratio of the maximum circumference to the minimum circumference of from 1.5 to 6 which is wrapped in a continuous transparent film, said film being a heat-shrunk product of a stretched crosslinked polyolefin resin film, being characterized in that the film is provided with specific elastic characteristic at wider parts of the article with longer circumferences, whereby said film is held tightly through the elastic tension at the wider parts, the value of said characteristic ranging from 1 to 80% in terms of the specific percent shrink (A) as defined by the following formula:

$$(A) = \frac{(x) - (y)}{(x)} \times 100 \, (\%)$$

wherein (x) is the maximum circumference of the film covered on the surface of said article and (y) the maximum circumference of the film released from said article and left to stand at 25° C. for 10 minutes.

According to preferred embodiments of the present invention, the shaped article is a vessel having at least one necked portion either at one end and both ends thereof. Typically, such a vessel is a glass bottle necked at one end with a mouth, which may also optionally have narrower contracted part between the wider parts, for example, the shoulder and the bottom. The glass bottle may either be empty or filled with liquids such as beverages (e.g. pressurized carbonated water). While the present invention is not limited to these vessels but inclusive of other goods such as rod-shaped articles which may either be hollow or stuffed differing in circumferences of cross-sections, e.g. bats, rackets, etc., the following descriptions refer primarily to vessels, especially glass bottles according to the preferred embodiments of the present invention.

The present invention is based on discovery of a special class of stretched films of crosslinked polyolefin resin having the following characteristics which are particularly suitable for stretch-shrink packaging according to the present invention:

(1) The film, although being stretched, has higher elongation at break;
(2) The film can be elongated uniformly without causing necking phenomenon;
(3) The film has good elastic recovery (rubber elasticity) on release from elongation;
(4) The film retains good heat-shrinkable characteristic after release from elongation; and
(5) The film can retain good elastic recovery on cooling to room temperature after being heated to near the melting point of the resin.

Figure 2:
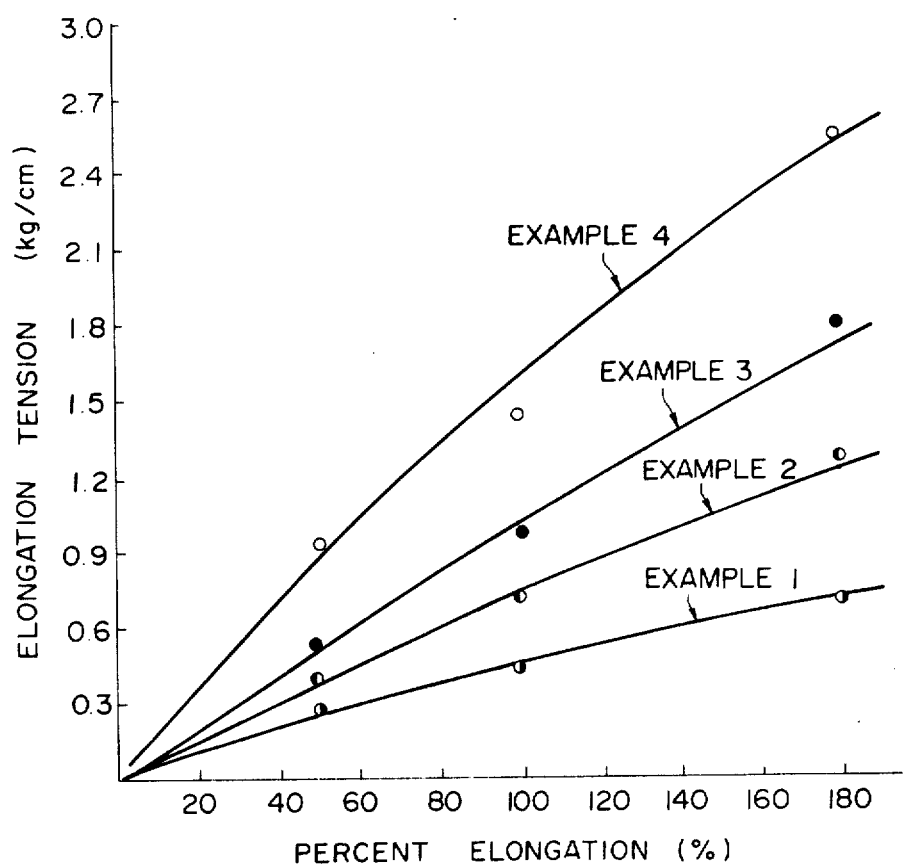
Figure 3:
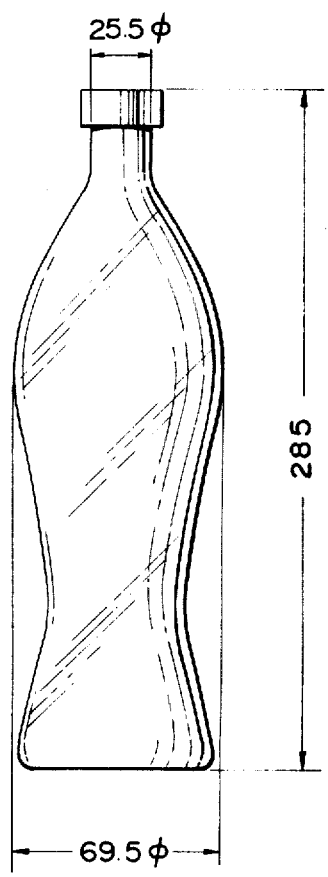
Figure 4:
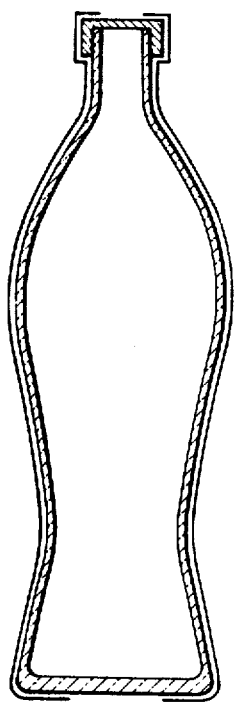
Figure 5:
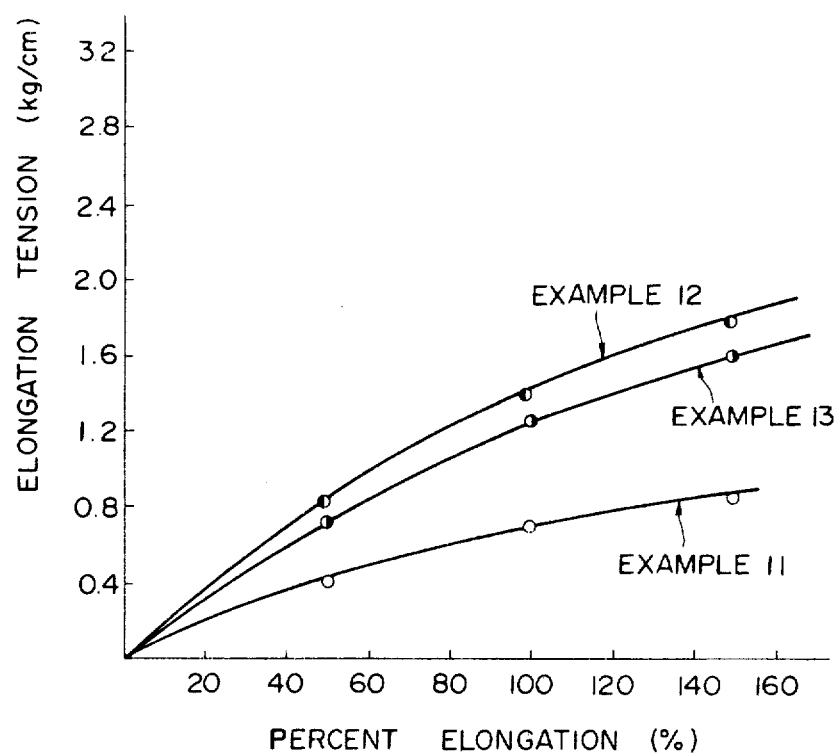

In the accompanying drawings,

FIG. 1 shows the elastic recovery of the films obtained in Examples 1 to 4, wherein the residual percent elongations are determined by elongating the film in the transverse direction to various percent elongations, holding thereat for one minute, followed by release, and measuring the residual elongations after ten minutes;

FIG. 2 the curves of percent elongation-elongation tension relation-ship of the films obtained in Examples 1 to 4, which indicate that no necking phenomenon is observed but the films are uniformly elongated in the transverse direction;

FIG. 3 the profile of the glass bottle to be coated in Examples 1 to 4, having necked portions both at the top and in the middle part of the bottle;

FIG. 4 vertical cross-section of the glass bottle coated with the films in Examples 1 to 4, wherein the dotted line shows the longitudinal cross-sectional view of the films; and FIG. 5 the curves of percent elongation-elongation tension relation-ship of the films obtained in Examples 11 to 13.

The packaged product of the present invention as specified above can be produced by a process, which comprises covering over the article a crosslinked polyolefin resin film, having heat-shrinkable property at least in the circumferential direction and being shaped in the form of a tube or a bag of which inner diameter is smaller than the maximum circumference and larger than the minimum circumference of the article, while giving a percent elongation of the film in the range from 5 to 500% in the circumferential direction, and then heating said film to effect heat shrinkage.

According to the process of the present invention, there is used a specific stretched film of a crosslinked polyolefin resin in the form of a tube or a bag having an inner diameter which is smaller than the maximum circumference and larger than the minimum circumference of the article to be coated, e.g. a vessel. While elongating the film in the circumferential direction, a vessel is inserted into a tubular or bag-shaped film; or alternatively while inserting forcibly the vessel into the tubular or bag-shaped film, the film is elongated through the inserting force of said vessel. In this manner, the part of the vessel with longer circumference than the inner circumference of the tubular or bag-shaped film can be tightly covered with the film in the first place. In the next step, the part with shorter circumference than the inner circumference of the tubular or bag-shaped film is tightly covered by subjecting the film at said part to heat shrinkage under heating.

In the coated vessel of the present invention prepared according to the above procedure, the specific feature of the coated film at the part including the maximum circumference resides in having a specific elastic characteristic on release from the vessel at room temperature. Therefore, through the elastic recovery (binding property) of said film, the coated film is firmly and tightly attached onto the vessel. Thus, during handling of the vessel, the coated film will never be loosened to come off from or whirl around the vessel but constantly secured at the desired position. In addition, due to excellent tensile strength, transparency and uniform elongation of the stretched, crosslinked polyolefin resin film, the novel coated vessel is also endowed with good protective effect, display effect and cap-seal effect. It is also possible according to the present invention to provide a coated vessel which cannot be obtained by the process of prior art. For example, even a vessel with a shape having 2 or more of the ratio of the body circumference to the neck circumference, which is conventionally used for caffeinated drinks, juices or beers, can readily be coated with the specific film of the present invention by the process as described above by suitable determination of the inner circumference of the tubular or bag-shaped film while selecting, for example, about 33% of percent elongation and about 33% of percent heat shrink for the film.

The terms "percent elongation" and "percent heat shrink" to be used in the present invention refer to the values calculated according to the following formulas:

$$\text{Percent Elongation (\%)} = \frac{\left(\begin{array}{c}\text{Film length}\\ \text{on}\\ \text{elongation}\end{array}\right) - \left(\begin{array}{c}\text{Film length}\\ \text{before}\\ \text{elongation}\end{array}\right)}{\text{(Film length before elongation)}} \times 100(\%)$$

$$\text{Percent Heat Shrink} = \frac{\left(\begin{array}{c}\text{Film length before}\\ \text{heat shrinkage}\end{array}\right) - \left(\begin{array}{c}\text{Film length after}\\ \text{heat shrinkage}\end{array}\right)}{\text{(Film length before heat shrinkage)}} \times 100(\%)$$

The specific stretched films of crosslinked polyolefin resin can be prepared by crosslinking the films of a polyolefin resin to a gel content suitably in the range from 3 to 70%, preferably in the range from 15 to 50%, either before and after stretching of the films under the conditions so as to provide the desirable characteristics as mentioned above.

The starting polyolefin resin may be at least one selected from the group consisting of polymers or copolymers of α-olefins (e.g. ethylene, propylene, butene, pentene, etc.), copolymers of α-olefins with vinyl monomers (e.g. vinyl acetate, acrylic acid, acrylic acid esters, vinyl chloride, vinylidene chloride, etc.) and metal-containing copolymers of ethylene with vinyl monomers (e.g. ionomers). Among them, a copolymer of ethylene-vinyl acetate containing 1 to 30 wt.% of vinyl acetate, more preferably 3 to 20 wt.%. of vinyl acetate is especially preferred since it can give a crosslinked stretched film excellent in such characteristics as transparency, elongation, elastic recovery on release from elongation as well as heat-shrinkable property. The polyolefin resin to be used in the present invention has desirably a melt index in the range from 0.2 to 20.

The crosslinking of the films may be conducted according to any conventional method for crosslinking polyolefin resins which is not particularly limited, so long as it can form co-valent intermolecular crosslinks in the film. Typical crosslinking methods are crosslinking by irradiation with ionized active rays such as gamma-rays or electron beam; crosslinking by irradiation with ultra-violet rays in the presence of peroxides; chemical crosslinking by heating in the presence of peroxides; and silane crosslinking wherein silane compounds are grafted in the presence of peroxides and the resultant grafted polyolefin resin film is exposed to a moistened atmosphere in the presence of a silanol condensation catalyst. The crosslinking degree may be in the range from 3 to 70%, preferably from 15 to 50% in terms of the gel content as defined by the following formula:

$$\text{Gel content (\%)} = \frac{\left(\begin{array}{c}\text{Sample weight before}\\ \text{extraction with}\\ \text{boiling p-xylene}\end{array}\right) - \left(\begin{array}{c}\text{Sample weight}\\ \text{extracted with}\\ \text{boiling p-xylene}\end{array}\right)}{\left(\begin{array}{c}\text{Sample weight before extraction with}\\ \text{boiling p-xylene}\end{array}\right)} \times 100\,(\%)$$

With a gel content less than 3%, the stretched film of the crosslinked polyolefin resin film is lowered in such characteristics as tensile strength, transparency, heat-shrinkable property, uniform elongation and elastic recovery or binding property after heat treatment under elongated state. Whereas, with a gel content exceeding 70%, the elongation of the stretched film is quite restricted to increase undesirably the elongation tension, whereby packaging characteristics may impractically be poor.

As mentioned above, stretching of the polyolefin resin may be effected either prior to or after crosslinking of the film. As stretching methods, there may be employed a roll stretching, tenter stretching or inflation stretching or a combination thereof. In the stretched films of crosslinked polyolefin resins to be used in the present invention, the degree of stretching is from 2 to 8 times at least in one axis. Preferably, in the form of a tube or a bag, stretching is effected so as to provide the film with a thickness of 10 to 200 $\mu$, a percentage elongation at break of 50 to 600%, a percentage heat shrink of 30 to 90% and a heat shrink tension of 10 to 500 g/mm$^2$ at least in the circumferential direction. With a film thickness of less than 10 $\mu$, the stiffness of the film is too low to be suitable for packaging and also smaller in the protective effect. On the contrary, a thickness over 200 $\mu$ is economically disadvantageous and also deficient in productivity due to increased tension on elongation. When the percent elongation at break in the circumferential direction is less than 50%, the film is applicable for only limited packaging purposes and liable to be torn, giving only poor effect for preventing scattering of broken glass fragments. On the other hand, when it is higher than 600%, a film having uniform elongation can hardly be obtained. Also, with a heat shrink tension lower than 10 g/mm$^2$, there can be obtained no tight coating of the film on the vessel; while with a tension over 500 g/mm$^2$, the heat shrink tension at the time of heat shrinkage of the film is so large that the film may sometimes suffer from peel-off at the sealed portion.

The thus obtained stretched films of the crosslinked polyolefin resin as described above have good film transparency with haze value of about 1%, and also good characteristics such as uniform elongation, elastic recovery on elongation, elastic recovery or binding property on cooling to room temperature after heating under elongation.

In preparation of the vessel according to the present invention, the above stretched film of crosslinked polyolefin resin may have letters and/or figures printed thereon, if desired. The film may be subjected, if necessary, to such pre-treatments such as corona discharge treatment to improve surface characteristics. Fabrication of the film into a tube or a bag may be practiced according to conventional procedure by slitting into suitable sizes followed by sealing with adhesives or by heat-sealing at marginal sections of the film.

As mentioned above, the excellent coating of the film tightly attached without ceases on the glass surface is believed to be related with the elastic characteristic of the film at the wider parts of the vessel having the specific percent shrink ratio (A) as defined above in the range from 1% to 80%. If the value (A) is less than 1%, the tightness of the coated film over the vessel may be insufficient and there may occur unfavorable loosening or whirling of the film during handling of the vessel. And this lower limit corresponds to the value obtained when packaging is practiced, using a stretched film of crosslinked polyolefin resin of the present invention, under percent elongation of about 5% followed by heat treatment at around the melting point of the polyolefin resin. On the other hand, for obtaining the coated vessel with the value (A) of 80% or higher, the percent elongation of the film at the time of packaging is required to be at least 500%, which is the upper limit as practically determined from the dimensions of the conventionally used vessels as well as from the elongation tension. Thus, while the value (A) is desired to fall within the range from 1 to 80% from practical standpoints, it may more preferably vary from 5 to 50%.

In contrast, at narrower parts of the vessel including the minimum circumference, the crosslinked polyolefin resin film has undergone heat shrinkage with by far smaller percentage than that for the heat-shrunk film obtained by the method of prior art. This means that the film can be coated tightly on the vessel at the narrower parts through greater heat shrink tension. Thus, in the packaged vessel obtained by the present invention, from the part having the maximum circumference to the part having the minimum circumference, the vessel is coated tightly with the crosslinked polyolefin resin film having very high strength, whereby there can be obtained a vessel excellent in the protective effect and the display effect. Furthermore, by use of a tubular or bag-shaped film with a length longer than the height of the vessel, the vessel can be covered from the head (cap portion) to the bottom with the film, thereby imparting cap-seal effect to the cap portion and cushioning effect to the bottom.

The stretched film of crosslinked polyolefin resin to be used in the present invention has uniformly elongating characteristic and therefore the letters and/or figures printed on one or both surfaces of said film can be elongated uniformly in the circumferential direction. Hence, it is possible to impart any complicated design to the film. Also, multi-color printing by direct printing on the curved surface, which has been difficult on conventional vessels, can readily be accomplished on the vessel of the present invention.

The process of the present invention is also more economical than any one in the prior art, because heating temperature can be lowered due to the smaller percent heat shrink required, to improve productivity as well as economy. Furthermore, the contents can be protected from excessive heat treatments. Accordingly, the present process is most suitable for packaging the vessels to be used for containing lactic acid drinks, vitamins or pharmaceuticals which may be damaged by application of a large amount of heat treatment; the vessels for containing petroleums or chemicals which have the danger of combustion, explosion or decomposition; the vessels made of plastics with lower melting points; and the vessels of glass or metals with good thermal conductivity.

As apparently seen from the above descriptions, the most important feature of the present invention resides in that the invention has been accomplished based on the discovery of the excellent elongatable property and the heatshrinkable property of the specific class of the stretched films of the crosslinked polyolefin resin. Therefore, a protective film can readily be applied on a vessel with a shape having a ratio of the body circumference to the neck circumference of 2 or more, for which the prior art method failed to give good coating. For example, even for a vessel with its circumferential ratio of about 3, there can very easily be applied coating with the film by selecting the conditions of elongation = 50% and heat shrinkage = 50%. While the present process is applicable for a vessel having a circumferential ratio which is from about 1.5 to about 6, it is more suitable for a vessel with a circumferential ratio of 2 to 5 from practical standpoints such as finishing or productivity of the vessels.

The vessels of the present invention may be made of such materials as plastics, glasses, metals, papers and woods, being usually equipped with outlets for discharging the contents at the upper part. In particular, the vessels made of glasses or plastics are of commercial importance.

In the crosslinked polyolefin resin to be used in the present invention, there may also be incorporated a small amount of modifiers or additives conventionally used in plastics working such as antioxidants, anti-static agents, heat stabilizers, anti-blocking agents, slipping agents, pigments, coloring agents, or a small amount of other polymers.

EXAMPLES 1-4

An ethylene-vinyl acetate copolymer containing 5.5 wt.% of vinyl acetate (MI=0.35, crystal melting point=101° C.) is fabricated by melt extrusion through an extruder of 45 mm in diameter equipped with an annular die into a tubular film of 50 mm in diameter and 900μ in thickness. This tubular film is flattened and four sample sheets are subjected to irradiation by means of an electron beam irradiating device (produced by Nisshin High-Voltage Co., Japan) under the condition of 500 KV-25 mA to the gel contents of 5%, 25%, 40% and 55%, respectively. Each of the resultant tubular crosslinked ethylene-vinyl acetate copolymer films is heated to a film temperature of 110° C., at which the film is subjected to biaxial stretching with stretching degrees of 6 times and 4 times in the longitudinal and transverse directions, respectively. The stretched films are slitted at both edges into unilayer films, which are in turn wound up. The physical properties of these films are shown in Table 1, FIG. 1 and FIG. 2. As apparently seen from the data, they have good strength, percent elongation, elastic recovery after elongation, heat shrinkability as well as excellent binding property after heat treatment.

TABLE 1

| | Gel content (%) | Tensile strength (Kg/mm²; L/T) | Percent elongation at break (%;L/T) | Percent heat shrink (%, at 100° C.; L/T) | Heat shrink tension (g/mm², at 100° C.; L/T) | Binding property (Kg/mm²) |
|---|---|---|---|---|---|---|
| Example 1 | 5 | 6/5 | 480/520 | 70/70 | 80/60 | 0.4 |
| Example 2 | 30 | 7/6 | 200/340 | 73/75 | 110/100 | 0.6 |
| Example 3 | 40 | 7/6 | 150/250 | 72/73 | 120/110 | 0.6 |
| Example 4 | 55 | 8/7 | 160/200 | 73/74 | 140/120 | 0.7 |

(Note)
1. L/T means (the value in the longitudinal direction)/ (the value in the transverse direction).
2. Binding property is determined by stretching the film in the transverse direction to the degree of 50 %, heating the stretched film under the condition of 100° C./10 seconds, followed by cooling to room temperature, and measuring the tension-elongation values.

After treating these films by corona discharge to adjust the surface tension thereof to 39 dyn/cm, patterns of 1 cm × 1 cm checks are printed thereon by the flexo method. Adhesion of the printing ink on the films is evaluated by the cellophane tape peel-off method to give good results for all of the films.

Each of the films is then subjected to the slit and heat-seal treatment to be formed into a tubular film of 120 mm in circumference, which is in turn cut into the length of 310 mm. These tubular films, each being 120 mm × 310 mm (circumference × length), are stretched in the circumferential direction (stretching degree = 83%) so as to provide tubular films with circular cross-sections having circumference of 220 mm. Then, into each of the thus stretched films is inserted a glass bottle (ratio of the maximum circumference to the minimum circumference being about 2.7) having the shape as illustrated in FIG. 3 (maximum circumference of the wider parts = 218 mm; minimum circumference of the necked part = 80 mm; height = 285 mm) equipped with a cap containing 500 ml of soda-water (inner pressure in the bottle at 25° C. = 2.5 kg/cm²). The glass bottle is inserted completely into the tubular film so that the both ends of the tubular film may extend longer by about 10 mm than the cap and the bottom of said glass bottle, respectively. In the next step, the thus covered bottle is passed through a hot tunnel to effect heat shrinkage of the film by heating to a film temperature of 100° C. (heat shrinkage of the film at the minimum circumference = about 33%) to produce the vessel covered with a protective film as illustrated in FIG. 4.

The film is found to be tightly contacted on the glass bottle even at the neck portion, providing also excellent coverings over the cap and the bottom.

After three months, the film on the vessel is subjected to measurement of percent shrink on release at room temperature and uniformity in elongation of the printed matter to give good results as shown in Table 2.

TABLE 2

| | Percent shrink on release at room temperature (25° C.,%) | Uniformity in elongation (%) |
|---|---|---|
| Example 1 | 12 | 10 |
| Example 2 | 15 | 8 |
| Example 3 | 18 | 5 |

TABLE 2-continued

| | Percent shrink on release at room temperature (25° C.,%) | Uniformity in elongation (%) |
|---|---|---|
| Example 4 | 24 | 2 |

(Note)
Uniformity in elongation is determined by measuring percent elongations of the printed check patterns on the film near the maximum circumference section of the wider part and calculating according to the following formula (the result is better as the value is smaller):

$$\text{Uniformity in elongation}(\%) = \left( \frac{\text{Maximum percent elongation}}{\text{Minimum percent elongation}} \right)$$

EXAMPLES 5–8

These Examples show the results of evaluation of the effect of preventing broken glass fragments from being scattered provided by the protective film of the present invention, when the glass bottles filled with soda-water covered with the protective films as prepared in Examples 1 to 4 are tested for breaking according to the horizontal dropping method. Table 3 clearly shows that they are fairly acceptable from the standard for "glass bottle applied with danger-proof coating".

The tests are conducted according to "The standard and the method for confirming the standard for glass bottles for filling soda-water" (Rule No. 49-7949 approved by the Minister of International Trade and Industry of Japan, published on Nov. 7, 1974), by permitting the horizontally held bottle on a horizontal plate at a distance of 75 cm from the floor to tumble down from the edge of the plate onto the concrete floor with thickness of 10 cm or more. The broken glass fragments remained within the circle of 1 m in radius from the dropped point are weighed. A percentage of the remained glass fragments of not less than 95 wt.% is rated as acceptable.

Table 3

| | Test sample | Remained glass fragments (%) | Evaluation |
|---|---|---|---|
| Example 5 | Example 1 | 100 | Good |
| Example 6 | Example 2 | 100 | Good |
| Example 7 | Example 3 | 100 | Good |
| Example 8 | Example 4 | 100 | Good |

EXAMPLES 9–11

The following polymers and the polymer composition are each mixed with 0.1% of erucylic acid amide as slip agent and each mixture is molten and extruded through an extruder of 45 mm in diameter equipped with a T-die (width=150 mm; slit=2.0 mm) into a flat film with thickness of 300μ.

A. Ethylene-vinyl acetate copolymer containing 10% vinyl acetate (MI=1.0, crystal melting point=94° C.)

B. Low density polyethylene (density=0.920, MI=0.4, crystal melting point=107° C.); and C. Mixture (7/3) of ethylene-vinyl acetate copolymer containing 10% vinyl acetate with high density polyethylene (density=0.950, MI=1.0, crystal melting point=130° C.)

Each flat film is irradiated by electron beam of 500 KV-25 mA to obtain a crosslinked film with gel content of 40%.

These crosslinked films are stretched by means of tenter stretching device having hot air heating means and being constituted of pre-heating section, stretching section and heat treatment section. While adjusting the temperature at the pre-heating section at 120° C. and that at the stretching section and the heat treatment section at 130° C., stretching is effected to the stretching degrees of two times in the longitudinal direction and three times in the transverse direction. After cooling, both ends of the film are slitted and wound up in a roll.

The resultant films have excellent tensile strength, percent elongation, heat shrinkability, binding property as well as good transparency as shown in Table 4 and FIG. 5.

Each of these films is made into a tubular film (inner circumference×length=120×205 mm) by slit, heat-seal and cutting treatments. Innerside of each film, along the inner wall of the film, there are inserted six guide plates made of copper, each having the dimensions of 20×0.3×250 mm (width×thickness×length). Into the vacant space thus formed by the six guide plates, there is inserted a glass bottle filled with 190 ml of soda-water (inner pressure at 25° C.=2.5 Kg/cm²), having maximum circumference at the wider part of 187 mm, minimum circumference at the neck of 80 mm and hight of 197 mm, the head portion being first inserted and the tubular film extending longer by about 10 mm than the head and the bottom of the bottle, respectively.

Then, the guide plates are drawn out while remaining the tubular film at the predetermined position.

Subsequently, the covered glass bottle is passed through a hot tunnel for heat shrinkage of the film by heating to a film temperature of 105° C. to provide a vessel tightly covered with a crosslinked polyolefin film. The glass bottles obtained are as good as those obtained in Examples 1 to 4. The maximum stretching degree of the covered film is found to be about 51%, while the maximum percent heat shrink about 33%.

TABLE 4

|  | Resin | Tensile strength (Kg/mm²) | Percent elongation at break (%) | Percent heat shrink (%) (at 100° C.) | Heat shrink tension (g/mm²) (at 100° C.) | Binding property (Kg/mm²) | Haze (%) |
|---|---|---|---|---|---|---|---|
| Example 9 | Ethylene-vinyl acetate copolymer | 4/6 | 550/450 | 50/65 | 80/150 | 0.5 | 1.8 |
| Example 10 | Low density polyethylene | 5/7 | 480/300 | 51/63 | 100/180 | 0.8 | 2.3 |
| Example 11 | Ethylene-vinyl acetate copolymer/ high density polyethylene | 5/8 | 520/350 | 32/50 | 110/200 | 1.0 | 2.6 |

(Note)
The values for tensile strength, percent elongation at break, percent heat shrink and heat shrink tension are given in terms of the longitudinal/the transverse.

The percent shrinks on release at room temperature of the respective covered films are shown in Table 5, which clearly evidences the fact that they are very firmly held on the glass. The dropping tests are also conducted by the same method as described in Examples 5–8 to give the good resutls as shown in Table 5.

TABLE 5

|  | Percent shrink on release at room temperature (%) | Glass fragments remained (%) |
|---|---|---|
| Example 9 | 19 | 100 |
| Example 10 | 14 | 100 |
| Example 11 | 10 | 100 |

EXAMPLE 12

A metal-containing ethylene copolymer (ethylene=96 mol.%, methacrylic acid=2 mol.%, sodium methacrylate=2 mol.%; MI=1.3, crystal melting point=96° C.) is extruded through an extruder of 45 mm in diameter into a tubular film of 450μ. This tubular film is crosslinked to the gel content of 50% by irradiation of electron beam. The crosslinked tubular film is stretched by the inflation method by heating to the temperature near its melting point with stretching degrees of five times in the longitudinal direction and three times in the transverse direction to obtain a film with thickness of 30μ. This film is found to have the excellent physical properties as shown in Table 6.

TABLE 6

| Tensile strength (Kg/mm²) | 6/5 (longitudinal/transverse) |
|---|---|
| Percent elongation at break (%) | 120/300 (longitudinal/transverse) |

TABLE 6-continued

| | |
|---|---|
| Percent heat shrink (at 120° C., %) | 72/70 (longitudinal/transverse) |
| Heat shrink tension (at 80° C., g/mm²) | 110/120 (longitudinal/transverse) |
| Binding property (Kg/mm2) | 0.8 |
| Haze (%) | 1.6 |

Using this film, a tubular film is prepared according to the same procedure as described in Example 1 and the resultant film is covered on the glass bottle containing 500 ml of soda-water in the same manner as in Example 1. As the result, the finished glass bottle is found to be similar to that obtained in Example 1 except that the percent shrink on release at room temperature of the covered film is 15%. This glass bottle is also found to be acceptable from the standard for danger-proof covering, as confirmed by the dropping test as previously described.

EXAMPLE 13

A film of 180μ in thickness made from an ethylenevinyl acetate copolymer containing 15% vinyl acetate (MI=0.6, crystal melting point=85° C.), in which there is added 0.5 wt.% of dicumyl peroxide, is heated to 50° C. and irradiated with ultra-violet ray to be crosslinked to the gel content of 40%. This film is stretched by Tentor at 120° C. to the stretching degree of 1.2 times in the longitudinal direction and 3.0 times in the transverse direction to provide a film of about 50μ in thickness.

Using the crosslinked stretched film as prepared above, the glass bottle containing soda-water is covered by the same method as in Example 3. As the result, there is obtained a covered glass bottle which is substantially the same as that of Example 3 except that the percent shrink on release at room temperature of the covered film is 20%. The result of the dropping test also shows the good effect for preventing scattering of glass fragments at the time of breaking.

COMPARISON EXAMPLE 1

A commercially available polyvinyl chloride film for shrink lable with thickness of 40μ (Hishilex, trade mark, produced by Mitsubishi Plastics Industries Ltd., Japan) is fabricated into a tubular film of 220 mm×220 mm (inner circumference×length). The same glass bottle containing 500 ml of soda-water as used in Example 1 is subjected to shrink packaging by heating the film to about 100° C. with this tubular film. There can be obtained a covered product with poor appearance in which the film around the neck portion is shrunk to give an appearance like pockmarked face. When dropping test is conducted for the covered bottle, the percentage of the remained glass fragments within the circle of 1 m in radius from the dropped point is found to be as small as 92.5 wt.% on an average of ten bottles, thus failing to be acceptable from the standard for glass bottles applied with danger-proof covering treatment. Such poor results are considered to be due to insufficient contact between the glass surface at the neck portion and the film rather than the problem of the film strength. With such a poor contact, glass fragments may be dropped out from innerside of the tubular film at the time of breaking.

COMPARISON EXAMPLES 2 AND 3

Tubular films of 800μ in thickness are molded by extrusion through an extruder of 45 mm in diameter from an ethylene-vinyl acetate copolymer containing 5.5 wt.% of vinyl acetate (MI=0.35, crystal melting point=101° C.) and low density polyethylene with density of 0.920, (MI=0.4, crystal melting point=107° C.), respectively. After cooling to room temperature, these films are heated again by infrared ray to 140° C., at which they are stretched to 5 times in the longitudinal direction and 4 times in the transverse direction to provide stretched films with thickness of about 40μ.

These films are found to have the physical properties as shown in Table 7, which clearly indicates that these films have substantially no heat shrink tension. After applying corona discharge treatments on these films, patterns of 1 cm×1 cm checks are printed thereon similarly as in Example 1. According to the same method as in Example 1, these films are covered over the glass bottles containing 500 ml of soda-water according to the same procedure as described in Example 1. The appearance of the finished coverings is very bad with the film around the neck portion being shrunk like pockmarked face.

TABLE 7

| | Resin | Tensile strength (Kg/mm²) | Percent elongation at break (%) | Percent heat shrink (%) | Heat shrink tension (g/mm²) | Binding property (Kg/mm²) | Haze (%) |
|---|---|---|---|---|---|---|---|
| Comparison example 1 | Ethylene-vinyl acetate copolymer | 3/2.5 | 570/590 | 70/60 (at 100° C.) | 0/0 | 0.1 | 4.9 |
| Comparison example 2 | Low density polyethylene | 3/2.5 | 460/520 | 70/60 (at 110° C.) | 10/10 | 0.2 | 7.0 |

(Note) see the Note in TABLE 4

The results of the dropping tests for evaluation of the effect for preventing scattering of glass fragments at the time of bottle crushing are 80 to 90 wt.% in terms of the remained glass fragment percentage within the circle of 1 m in radius with the dropped point, thus failing to be acceptable from the standard for the glass bottles applied with danger-proof covering treatment. The uniformity in elongation of the printed pattern positioned at the maximum circumference part is measured to be 50% or more for the ethylene-vinyl acetate copolymer film and 150% or more for the low density polyethylene film. With such a poor uniformity in elongation of the printed pattern, no label ring effect can be expected.

I claim:

1. In a packaged article comprising a shaped article having different circumferences of the cross-sections along the longitudinal axis thereof with a ratio of the maximum circumference to the minimum circumference of from 1.5 to 6 which is wrapped in a continuous transparent film, said film being a heat-shrunk product of a stretched crosslinked polyolefin resin film, the improvement which comprises the film having specific elastic characteristic at wider parts of the article with longer circumferences, thereby holding said film tightly through the elastic tension at the wider parts, the value of said characteristic ranging from 1 to 80% in terms of the specific percent shrink (A) as defined by the following formula:

$$(A) = \frac{(x) - (y)}{(x)} \times 100 \, (\%)$$

wherein (x) is the maximum circumference of the film covered on the surface of said article and (y) the maximum circumference of the film released from said article and left to stand at 25° C. for 10 minutes.

2. A packaged article according to claim 1, wherein the shaped article is a vessel having at least one necked portion.

3. A packaged article according to claim 1, wherein the shaped article is a glass bottle containing beverage.

4. A packaged article according to claim 3, wherein the glass bottle is internally pressurized.

5. A packaged article according to claim 1, wherein the specific shrinkage ratio (A) is in the range from 5 to 50%.

6. A packaged article according to claim 1, wherein the polyolefin resin is prepared from at least one selected from the group consisting of polymers or copolymers of α-olefins, copolymers of α-olefins with vinyl monomers containing at least 50 wt.% of α-olefins and metal-containing copolymers of ethylene with vinyl monomers.

7. A packaged article according to claim 6, wherein the polyolefin resin is prepared from an ethylenevinyl acetate copolymer containing 1 to 30 wt.% of vinyl acetate.

8. A packaged article according to claim 7, wherein the content of vinyl acetate is from 3 to 20 wt.%.

9. A packaged article according to claim 8, wherein the polyolefin resin is crosslinked to an extent of 3 to 70% in terms of the gel content.

10. A packaged article according to claim 9, wherein the gel content is from 15 to 50%.

11. A packaged article according to claim 1, wherein the polyolefin resin film is applied with printing on at least one surface thereof.

12. A packaged article according to claim 1, wherein the ratio of the maximum circumference to the minimum circumference is from 2 to 5.

13. A process for packaging a shaped article having different circumferences of the cross-sections along the longitudinal axis thereof with a ratio of the maximum circumference to the minimum circumference of from 1.5 to 6, which comprises covering over the article a crosslinked polyolefin resin film, having heat-shrinkable property at least in the circumferential direction and being shaped in the form of a tube or a bag of which inner diameter is smaller than the maximum circumference and larger than the minimum circumference of the article, while giving a stretch of the film to a degree of 5 to 500% in the circumferential direction, and then heating said film to effect heat shrinkage.

* * * * *